US011828465B2

(12) United States Patent
Naik et al.

(10) Patent No.: US 11,828,465 B2
(45) Date of Patent: Nov. 28, 2023

(54) COMBUSTOR FUEL ASSEMBLY

(71) Applicant: GENERAL ELECTRIC COMPANY, Schenectady, NY (US)

(72) Inventors: Pradeep Naik, Bengaluru (IN); Manampathy G. Giridharan, Evendale, OH (US); Michael T. Bucaro, Arvada, CO (US); Ajoy Patra, Bengaluru (IN); Perumallu Vukanti, Bengaluru (IN); R Narasimha Chiranthan, Bengaluru (IN); Gregory A. Boardman, Owens Cross Roads, AL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/685,883

(22) Filed: Mar. 3, 2022

(65) Prior Publication Data
US 2023/0235884 A1 Jul. 27, 2023

(30) Foreign Application Priority Data
Jan. 21, 2022 (IN) .............................. 202211003539

(51) Int. Cl.
*F23R 3/00* (2006.01)
*F02C 3/04* (2006.01)
*F23R 3/28* (2006.01)

(52) U.S. Cl.
CPC ................ *F23R 3/002* (2013.01); *F02C 3/04* (2013.01); *F23R 3/286* (2013.01); *F05D 2240/35* (2013.01)

(58) Field of Classification Search
CPC ........ F02C 3/04; F05D 2240/35; F23R 3/002; F23R 3/286; F23R 3/28
See application file for complete search history.

(56) References Cited

U.S. PATENT DOCUMENTS

| 4,100,733 | A * | 7/1978 | Striebel .................. F23R 3/286 239/431 |
| 5,235,814 | A | 8/1993 | Leonard |
| 6,298,667 | B1 | 10/2001 | Glynn et al. |
| 7,013,649 | B2 | 3/2006 | Monty |
| 8,683,804 | B2 * | 4/2014 | Boardman ............. F23R 3/286 60/737 |
| 8,739,550 | B2 | 6/2014 | Etemad et al. |
| 9,587,833 | B2 | 3/2017 | Lee |
| 10,006,637 | B2 * | 6/2018 | Lee ......... F23C 7/002 |
| 10,295,190 | B2 | 5/2019 | Boardman et al. |
| 10,352,569 | B2 | 7/2019 | Boardman et al. |
| 10,393,382 | B2 | 8/2019 | Boardman et al. |
| 10,890,329 | B2 | 1/2021 | Boardman et al. |

(Continued)

FOREIGN PATENT DOCUMENTS

| CN | 102032568 B | 4/2014 |
| CN | 105229379 B | 6/2017 |
| EP | 1840465 A3 | 10/2007 |

*Primary Examiner* — Arun Goyal
*Assistant Examiner* — Henry Ng
(74) *Attorney, Agent, or Firm* — McGarry Bair PC

(57) ABSTRACT

A turbine engine can include a compressor section, a combustion section, and a turbine section in serial flow arrangement. The combustion section can have a combustor with a combustor liner at least partially defining a combustion chamber, as well as a fuel-air mixer including at least one set of mixing tubes.

13 Claims, 9 Drawing Sheets

(56) References Cited

U.S. PATENT DOCUMENTS

| | | | |
|---|---|---|---|
| 11,156,361 B2 | 10/2021 | Boardman et al. | |
| 2009/0293484 A1* | 12/2009 | Inoue | F23R 3/286 |
| | | | 60/740 |
| 2010/0192579 A1* | 8/2010 | Boardman | F23R 3/34 |
| | | | 60/737 |
| 2011/0016866 A1* | 1/2011 | Boardman | F23R 3/36 |
| | | | 60/730 |
| 2012/0180487 A1 | 7/2012 | Uhm et al. | |
| 2014/0033718 A1 | 2/2014 | Manoharan et al. | |
| 2014/0053571 A1* | 2/2014 | Keener | F23R 3/283 |
| | | | 60/782 |
| 2016/0102863 A1* | 4/2016 | Yoshino | F23R 3/286 |
| | | | 239/428 |
| 2016/0178206 A1* | 6/2016 | Yoshino | F23R 3/045 |
| | | | 239/408 |
| 2017/0248318 A1* | 8/2017 | Kulkarni | F23R 3/46 |
| 2017/0292709 A1* | 10/2017 | Portillo Bilbao | F23R 3/002 |
| 2019/0107284 A1* | 4/2019 | Seo | F23R 3/286 |
| 2019/0271470 A1 | 9/2019 | Boardman et al. | |
| 2020/0263873 A1* | 8/2020 | Boardman | F23R 3/286 |
| 2021/0102703 A1* | 4/2021 | Tada | F02C 7/22 |
| 2021/0325046 A1* | 10/2021 | Lin | F23R 3/16 |
| 2022/0220897 A1* | 7/2022 | Seok | F23R 3/343 |
| 2022/0228741 A1* | 7/2022 | Jeong | F23R 3/14 |
| 2022/0260254 A1* | 8/2022 | Go | F23R 3/16 |

\* cited by examiner

COMBUSTOR FUEL ASSEMBLY

CROSS-REFERENCE TO RELATED APPLICATION(S)

This application claims priority to Indian Patent Application No. 202211003539, filed Jan. 21, 2022, which is incorporated herein by reference in its entirety.

TECHNICAL FIELD

The present subject matter relates generally to a combustor for a turbine engine having a fuel assembly, and more specifically to a fuel assembly having a fuel-air mixing arrangement.

BACKGROUND

Turbine engines are driven by a flow of combustion gases passing through the engine to rotate a multitude of turbine blades, which, in turn, rotate a compressor to provide compress air to the combustor for combustion. A combustor can be provided within the turbine engine and is fluidly coupled with a turbine into which the combusted gases flow.

The use of hydrocarbon fuels in the combustor of a turbine engine is known. Generally, air and fuel are fed to a combustion chamber, the air and fuel are mixed, and then the fuel is burned in the presence of the air to produce hot gas. The hot gas is then fed to a turbine where it cools and expands to produce power. By-products of the fuel combustion typically include environmentally unwanted byproducts, such as nitrogen oxide and nitrogen dioxide (collectively called NOR), carbon monoxide CO), unburned hydrocarbons (UHC) (e.g., methane and volatile organic compounds that contribute to the formation of atmospheric ozone), and other oxides, including oxides of sulfur (e.g., $SO_2$ and $SO_3$).

Varieties of fuel for use in combustion turbine engines are being explored. Hydrogen or hydrogen mixed with another element or compound can be used for combustion, however hydrogen or a hydrogen mixed fuel can result in a higher flame temperature than traditional fuels. That is, hydrogen or a hydrogen mixed fuel typically has a wider flammable range and a faster burning velocity than traditional fuels such petroleum-based fuels, or petroleum and synthetic fuel blends.

Standards stemming from air pollution concerns worldwide regulate the emission of oxides of nitrogen ($NO_x$), unburned hydrocarbons (UHC), and carbon monoxide (CO) generated as a result of the turbine engine operation. In particular, nitrogen oxide ($NO_x$) is formed within the combustor as a result of high combustor flame temperatures during operation. It is desirable to decrease $NO_x$ emissions while still maintaining desirable efficiencies by regulating the profile and or pattern within the combustor.

DETAILED DESCRIPTION

Figure 1:
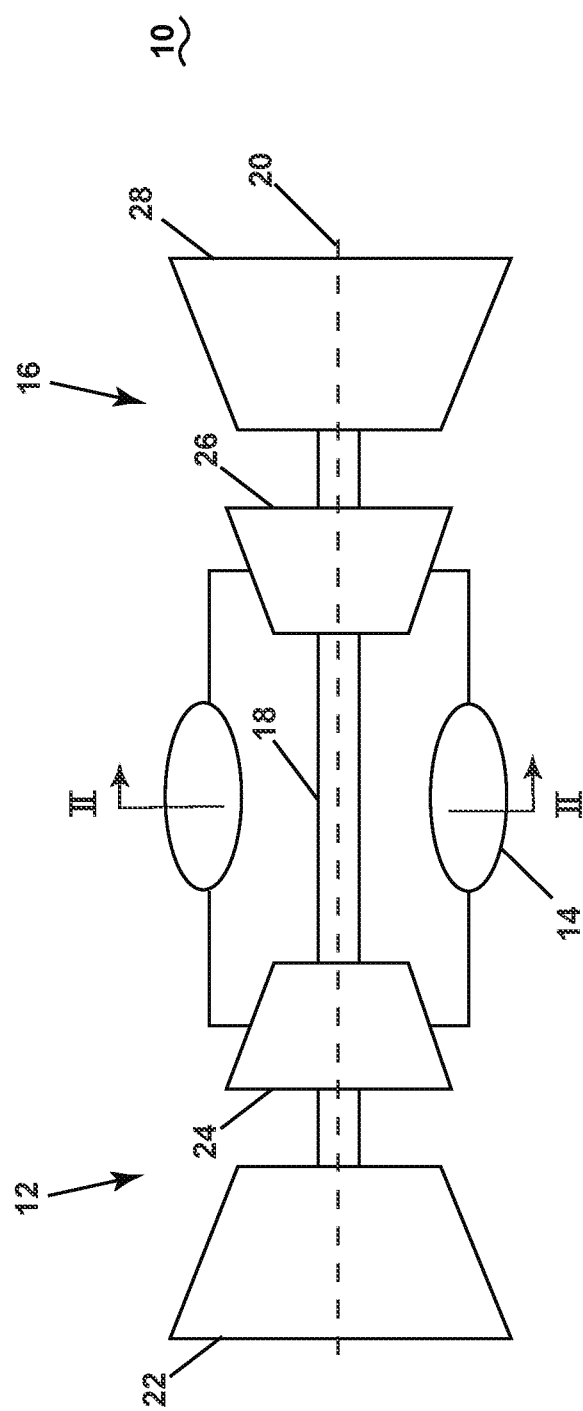
FIG. 1 is a schematic view of a turbine engine having a compression section, a combustion section, and a turbine section in accordance with various aspects described herein.

Aspects of the disclosure described herein are directed to a combustor with a fuel nozzle assembly. For purposes of illustration, the present disclosure will be described with respect to a turbine engine. It will be understood, however, that aspects of the disclosure described herein are not so limited and that a combustor as described herein can be implemented in engines, including but not limited to turbojet, turboprop, turboshaft, and turbofan engines. Aspects of the disclosure discussed herein may have general applicability within non-aircraft engines having a combustor, such as other mobile applications and non-mobile industrial, commercial, and residential applications.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

The term "fluid" may be a gas or a liquid. The term "fluid communication" or "fluid coupling" means that a fluid is capable of making the connection between the areas specified.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one.

Approximating language, as used herein throughout the specification and claims, is applied to modify any quantitative representation that could permissibly vary without resulting in a change in the basic function to which it is related. Accordingly, a value modified by a term or terms, such as "about", "approximately", "generally", and "substantially", are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

FIG. 1 is a schematic view of a turbine engine 10. As a non-limiting example, the turbine engine 10 can be used within an aircraft. The turbine engine 10 can include, at least, a compressor section 12, a combustion section 14, and a turbine section 16. A drive shaft 18 rotationally couples the compressor section 12 and turbine section 16, such that rotation of one affects the rotation of the other, and defines a rotational axis 20 for the turbine engine 10.

The compressor section 12 can include a low-pressure (LP) compressor 22, and a high-pressure (HP) compressor 24 serially fluidly coupled to one another. The turbine section 16 can include an HP turbine 26, and an LP turbine 28 serially fluidly coupled to one another. The drive shaft 18 can operatively couple the LP compressor 22, the HP compressor 24, the HP turbine 26 and the LP turbine 28 together. Alternatively, the drive shaft 18 can include an LP drive shaft (not illustrated) and an HP drive shaft (not illustrated). The LP drive shaft can couple the LP compressor 22 to the LP turbine 28, and the HP drive shaft can couple the HP compressor 24 to the HP turbine 26. An LP spool can be defined as the combination of the LP compressor 22, the LP turbine 28, and the LP drive shaft such that the rotation of the LP turbine 28 can apply a driving force to the LP drive shaft, which in turn can rotate the LP compressor 22. An HP spool can be defined as the combination of the HP compressor 24, the HP turbine 26, and the HP drive shaft such that the rotation of the HP turbine 26 can apply a driving force to the HP drive shaft which in turn can rotate the HP compressor 24.

The compressor section 12 can include a plurality of axially spaced stages. Each stage includes a set of circumferentially-spaced rotating blades and a set of circumferentially-spaced stationary vanes. The compressor blades for a stage of the compressor section 12 can be mounted to a disk, which is mounted to the drive shaft 18. Each set of blades for a given stage can have its own disk. The vanes of the compressor section 12 can be mounted to a casing which can extend circumferentially about the turbine engine 10. It will be appreciated that the representation of the compressor section 12 is merely schematic and that there can be any number of blades, vanes and stages. Further, it is contemplated that there can be any number of other components within the compressor section 12.

Similar to the compressor section 12, the turbine section 16 can include a plurality of axially spaced stages, with each stage having a set of circumferentially-spaced, rotating blades and a set of circumferentially-spaced, stationary vanes. The turbine blades for a stage of the turbine section 16 can be mounted to a disk which is mounted to the drive shaft 18. Each set of blades for a given stage can have its own disk. The vanes of the turbine section can be mounted to the casing in a circumferential manner. It is noted that there can be any number of blades, vanes and turbine stages as the illustrated turbine section is merely a schematic representation. Further, it is contemplated that there can be any number of other components within the turbine section 16.

The combustion section 14 can be provided serially between the compressor section 12 and the turbine section 16. The combustion section 14 can be fluidly coupled to at least a portion of the compressor section 12 and the turbine section 16 such that the combustion section 14 at least partially fluidly couples the compressor section 12 to the turbine section 16. As a non-limiting example, the combustion section 14 can be fluidly coupled to the HP compressor 24 at an upstream end of the combustion section 14 and to the HP turbine 26 at a downstream end of the combustion section 14.

During operation of the turbine engine 10, ambient or atmospheric air is drawn into the compressor section 12 via a fan (not illustrated) upstream of the compressor section 12, where the air is compressed defining a pressurized air. The pressurized air can then flow into the combustion section 14 where the pressurized air is mixed with fuel and ignited, thereby generating combustion gases. Some work is extracted from these combustion gases by the HP turbine 26, which drives the HP compressor 24. The combustion gases are discharged into the LP turbine 28, which extracts additional work to drive the LP compressor 22, and the exhaust gas is ultimately discharged from the turbine engine 10 via an exhaust section (not illustrated) downstream of the turbine section 16. The driving of the LP turbine 28 drives the LP spool to rotate the fan (not illustrated) and the LP compressor 22. The pressurized airflow and the combustion gases can together define a working airflow that flows through the fan, compressor section 12, combustion section 14, and turbine section 16 of the turbine engine 10.

Figure 2:
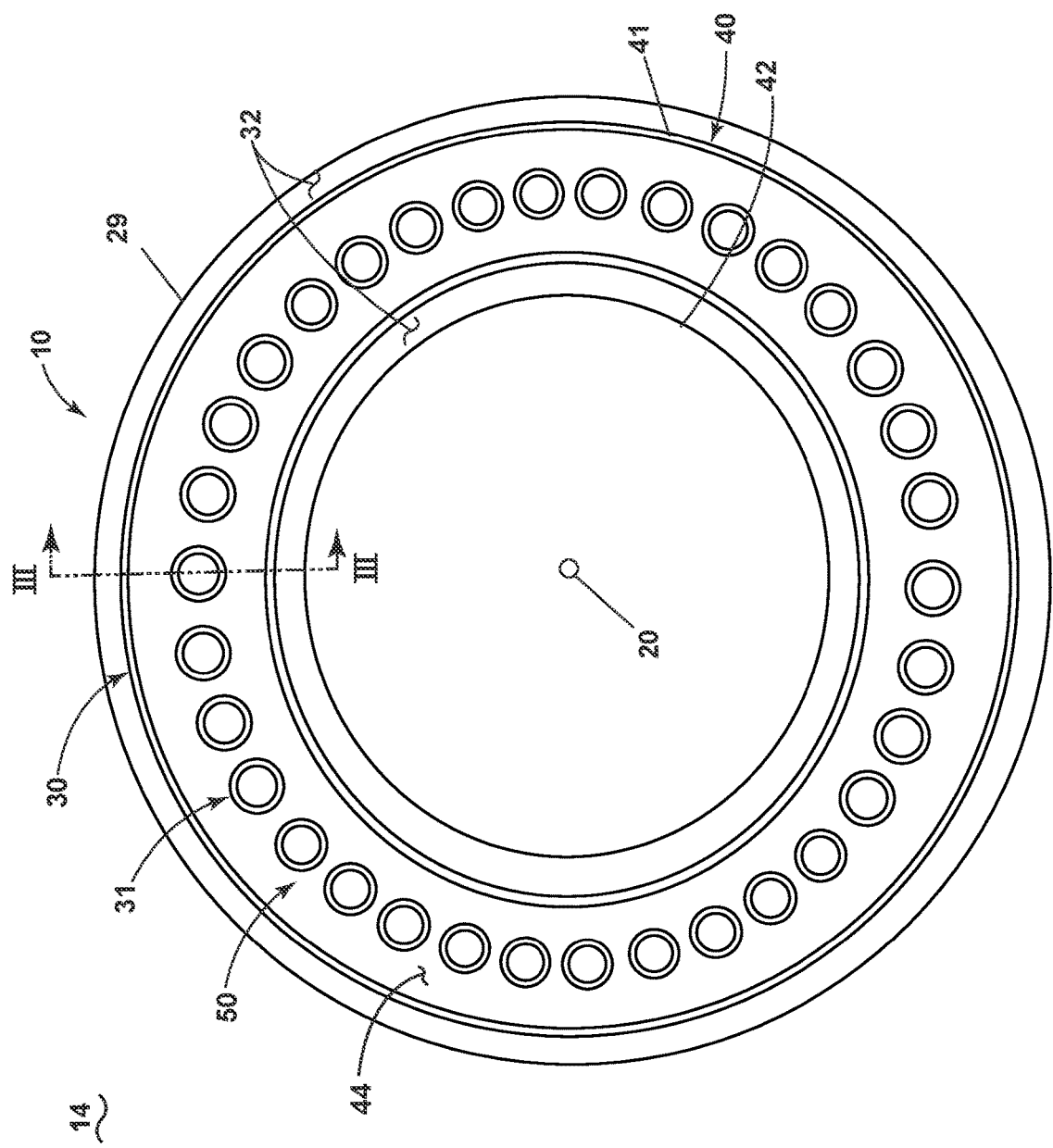
FIG. 2 is a cross-sectional view of the combustion section of FIG. 1 along line II-II in accordance with various aspects described herein.

FIG. 2 depicts a cross-sectional view of the combustion section 14 along line II-II of FIG. 1. The combustion section 14 can include a combustor 30 with an annular arrangement of fuel injectors 31 disposed around the centerline or rotational axis 20 of the turbine engine 10. It should be appreciated that the annular arrangement of fuel injectors 31 can be one or multiple fuel injectors, and one or more of the fuel injectors 31 can have different characteristics. The combustor 30 can have a can, can-annular, or annular arrangement depending on the type of engine in which the combustor 30 is located. In a non-limiting example, the combustor 30 can have a combination arrangement located with a casing 29 of the engine.

The combustor 30 can be at least partially defined by a combustor liner 40. In some examples, the combustor liner 40 can include an outer liner 41 and an inner liner 42 concentric with respect to each other and arranged in an annular fashion about the engine centerline or rotational axis 20. In some examples, the combustor liner 40 can have an annular structure about the combustor 30. In some examples, the combustor liner 40 can include multiple segments or portions collectively forming the combustor liner 40. A dome assembly 44 together with the combustor liner 40 can at least partially define a combustion chamber 50 arranged annularly about the engine centerline or rotational axis 20. A compressed air passageway 32 can be defined at least in part by both the combustor liner 40 and the casing 29.

Figure 3:
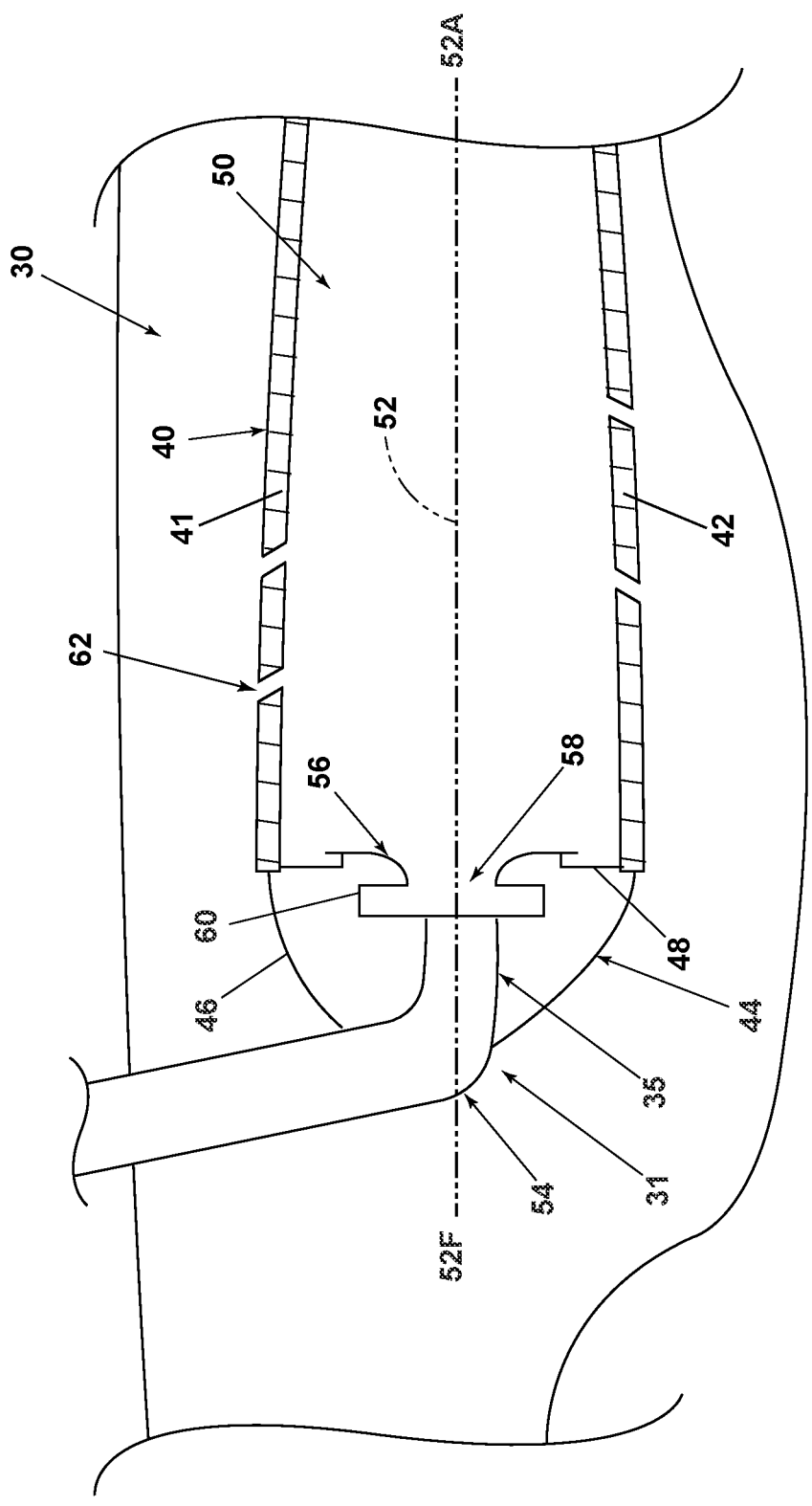
FIG. 3 is a cross-sectional view of a combustor that can be utilized in the combustion section of FIG. 2 along line in accordance with various aspects described herein.

FIG. 3 depicts a cross-sectional view taken along line of FIG. 2 illustrating a portion of the combustion section 14. The combustor 30 can include a fuel assembly 35 configured to provide at least fuel to the combustor 30. The fuel assembly 35 can at least partially form the fuel injector 31. In some examples, the fuel assembly 35 can include an annular arrangement of fuel nozzles. It should be appreciated that such fuel nozzles can be organized in any suitable arrangement, pattern, grouping, or the like.

The dome assembly 44 can include a dome wall 46 and a deflector 48. The combustor liner 40 and dome assembly 44 can collectively at least partially define the combustion chamber 50 about a longitudinal axis 52. The longitudinal axis 52 can extend between a forward direction 52F and an aft direction 52A as shown.

At least one fuel supply 54 can be fluidly coupled to the combustion chamber 50 to supply fuel to the combustor 30. The fuel can include any suitable fuel, including hydrocarbon fuel, hydrogen fuel, or a mixture of differing fuel types, in non-limiting examples.

The fuel supply 54 can be disposed within the dome assembly 44 to define a fuel outlet 58. It is contemplated that air can also be supplied or provided to the combustion chamber 50 by way of the fuel outlet 58. In this manner, the fuel outlet 58 can provide a fuel-air mixture to the combustion chamber 50. In addition, in some examples, multiple fuel injectors or premixers can be located on the dome wall 46. In some examples, multiple fuel injectors or premixers can be arranged in discrete clusters or groups on the dome wall 46.

A flare cone 56 can be provided downstream of the fuel supply 54 in some examples. A swirler 60 can also be provided at the fuel assembly 35 to swirl incoming air in proximity to fuel exiting the fuel supply 54 and provide a homogeneous mixture of air and fuel entering the combustor 30.

A set of dilution holes 62 can be provided in the combustor liner 40 and configured to direct air into the combustion chamber 50 for temperature control, flame shaping, fuel-air mixing, or the like. Any number of dilution holes can be provided in the set of dilution holes 62. The set of dilution holes 62 can have any suitable patterning or arrangement over the combustor liner 40, including linear rows, irregular groups, variable hole diameters, or the like, or combinations thereof. It is also contemplated that the combustor 30 can be formed without any dilution holes. In one example, multiple premixers can be arranged on the dome wall 46 without use of dilution holes.

Figure 4:
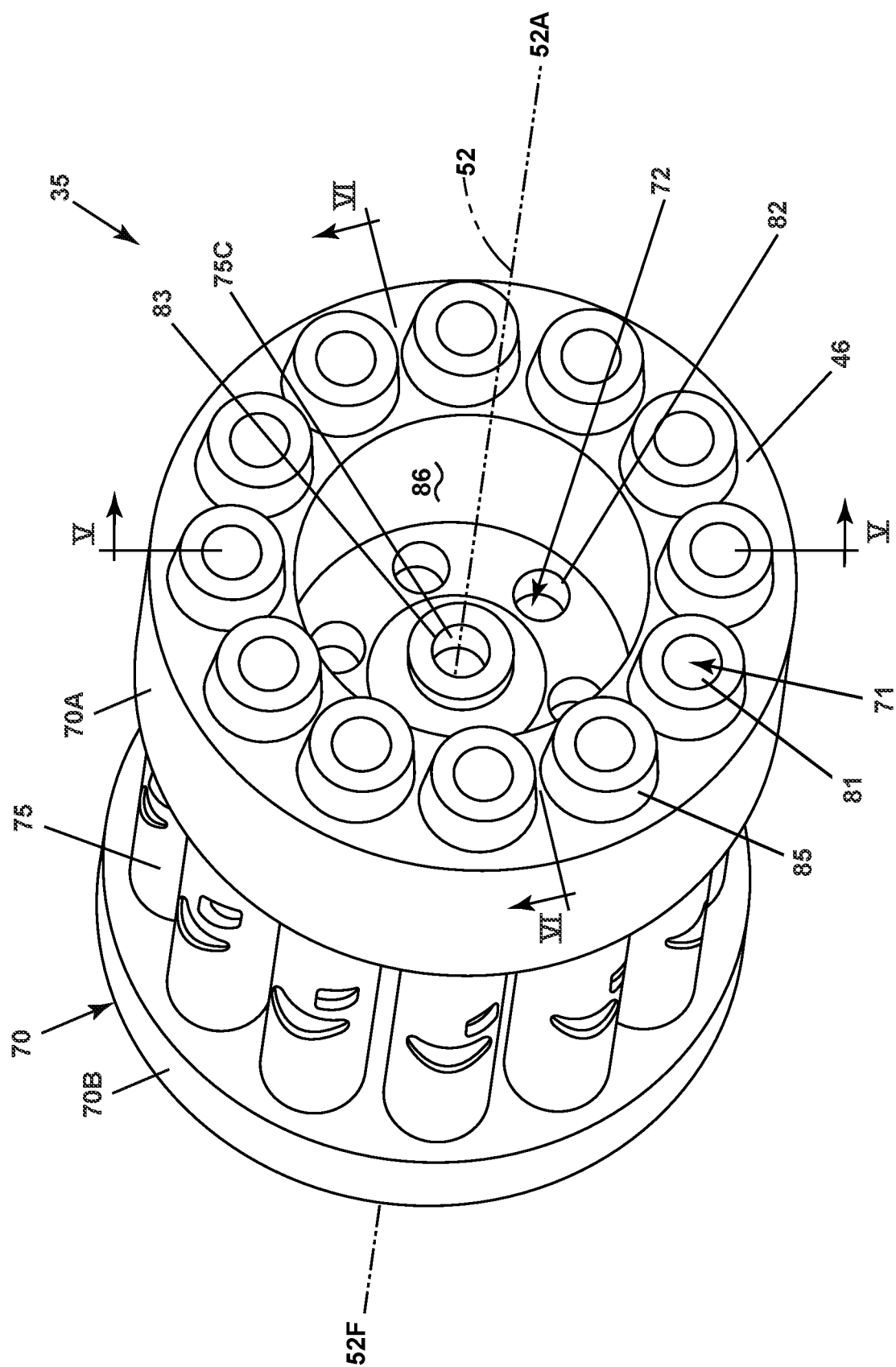
FIG. 4 is a perspective view of a fuel assembly that can be utilized in the combustor of FIG. 3 in accordance with various aspects described herein.

Turning to FIG. 4, a perspective view of the fuel assembly 35 is shown in one exemplary implementation. The fuel assembly 35 can be in the form of a fuel-air mixer configured to provide multiple, tailored mixtures of fuel and air into the combustion chamber 50 (FIG. 3). The fuel assembly 35 can include a body 70 aligned with the longitudinal axis 52 as shown. The body 70 can include a first collar 70A and a second collar 70B. In some examples, the body 70 can include the dome wall 46 and fuel outlet 58 (FIG. 3). The dome wall 46 can at least partially form the first collar 70A in the illustrated example, though this need not be the case.

The body 70 can include multiple interior channels or mixing tubes 75 for supplying or mixing air or fuel upstream of the combustion chamber 50 (FIG. 3). The mixing tubes 75 can extend through either or both of the first or second collars 70A, 70B. Additionally or alternatively, the first or second collars 70A, 70B can at least partially define the mixing tubes 75.

In the example shown, a first set 71 of mixing tubes 75, a second set 72 of mixing tubes 75, and a central mixing tube 75C are illustrated in the body 70 of the fuel assembly 35. Any number of mixing tubes 75 can be provided in the first set 71 or second set 72. In some examples, multiple central mixing tubes 75C can be provided proximate the center of the body 70. The mixing tubes 75, 75C can be identical to one another or have differing properties, including differing materials or differing geometric properties, in some examples.

In the example shown, the first set 71 of mixing tubes 75 can be arranged annularly about the body 70. The second set 72 of mixing tubes 75 can also be arranged annularly about the body 70 radially inward of the first set 71 of mixing tubes 75 with respect to the longitudinal axis 52. The central mixing tube 75C can extend through the body 70 radially inward of the second set 72 of mixing tubes 75. In this manner, the first set 71 of mixing tubes 75, second set 72 of mixing tubes 75, and central mixing tube 75C can be concentrically arranged about the longitudinal axis 52. It will be understood that the first set 71 of mixing tubes 75 or second set 72 of mixing tubes 75 can have any suitable patterning or arrangement of mixing tubes in the fuel assembly 35, including linear rows, circles, multiple concentric circles, irregular groupings, or the like, or combinations thereof.

The mixing tubes 75 and central mixing tube 75C can include at least one air inlet, at least one fuel inlet, and a mixture outlet. In the illustrated example, each mixing tube 75 in the first set 71 can include a first mixture outlet 81, each mixing tube 75 in the second set 72 can include a second mixture outlet 82, and the central mixing tube 75C can include a central mixture outlet 83. The first mixture outlets 81, second mixture outlets 82, and central mixture outlet 83 can confront the combustion chamber 50 (FIG. 3) and collectively form the fuel outlet 58. The first mixture outlets 81 can be positioned aft of the second mixture outlets 82 with respect to the longitudinal axis 52. The central mixture outlet 83 can be located forward of the first mixture outlets 81 with respect to the longitudinal axis 52.

In some examples, the body 70 can include a projecting tip 85 at any of the first mixture outlets 81, second mixture outlets 82, or central mixture outlet 83. Such projecting tips 85 can be configured to separate or isolate at least a portion of the fuel outlet 58 from the dome wall 46. In the example shown, projecting tips 85 are provided at the first mixture outlets 81 and the central mixture outlet 83. The projecting tips 85 can have any suitable geometric profile including cylindrical, conical, symmetric, irregular, or the like, or combinations thereof.

In the example shown, the body 70 can include a mixing chamber 86 positioned radially inward of the first set 71 of mixing tubes 75 as shown. The mixing chamber 86 can be fluidly coupled to any of the mixing tubes 75, 75C. In the illustrated example, the second mixture outlets 82 of the second set 72 of mixing tubes 75 and the central mixture outlet 83 of the central mixing tube 75C are fluidly coupled to the mixing chamber 86 though this need not be the case.

Figure 5:
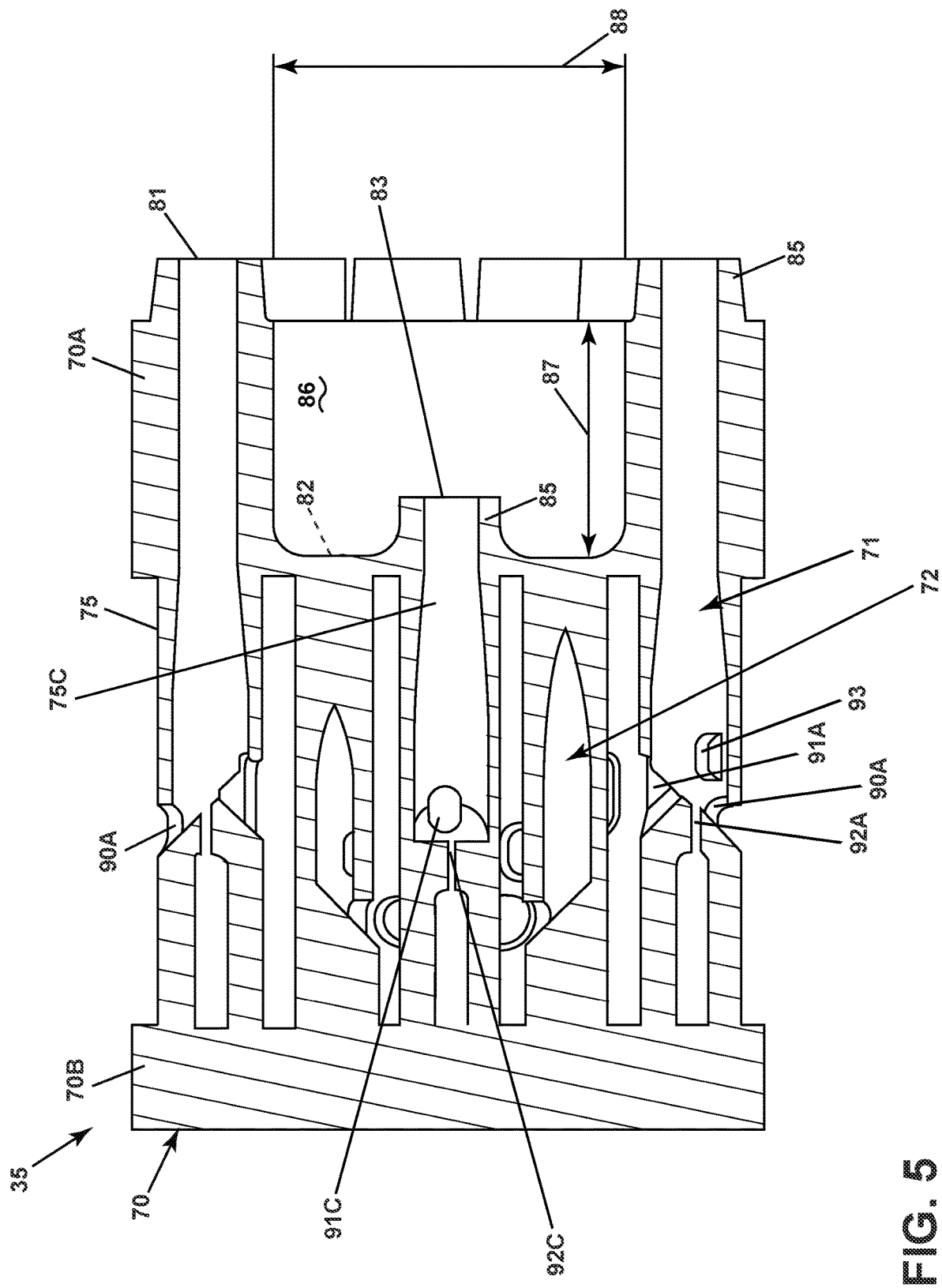
FIG. 5 is a side cross-sectional view of the fuel assembly of FIG. 4 along line V-V.

Turning to FIG. 5, a side cross-sectional view of the fuel assembly 35 is illustrated along the line V-V of FIG. 4. In this view, interior portions of the first set 71 of mixing tubes 75, second set 72 of mixing tubes 75, and central mixing tube 75C are shown. In the illustrated example, the mixing tubes 75 are shown as being integrally formed or unitarily formed with the first collar 70A and second collar 70B, though this need not be the case. It is contemplated that the first collar 70A or second collar 70B can be a separate structure and coupled to the mixing tubes 75.

The mixing chamber 86 can define a mixing length 87 and a width 88. In some non-limiting examples, the mixing length 87 can be between 0.2-10 times the width 88, including 0.5-6 times the width 88. The width 88 can be constant or variable along the longitudinal axis 52 (FIG. 3). In some examples, the width 88 can increase, decrease, or remain constant along the longitudinal axis 52 (FIG. 4). In this manner, the mixing chamber 86 can form a diverging, converging, or constant-area mixing passage within the body 70 of the fuel assembly 35.

It is also contemplated that the central mixing tube 75C can have a longer axial length than the second set 72 of mixing tubes 75. In the illustrated example, the central mixing tube 75C includes projecting tip 85 extending into the mixing chamber 86 and forming the central mixture outlet 83. In this manner, each of the first mixture outlets 81, second mixture outlets 82, and central mixture outlet 83 can be axially staggered within the body 70 with respect to the longitudinal axis 52.

It is also contemplated that the mixing chamber 86 can have a first converging portion followed by a second constant-area portion, or an initial converging portion followed by a second diverging portion, or a first diverging portion followed by a second constant-area portion, or a first diverging portion followed by a second converging portion, in non-limiting examples. The mixing chamber 86 can be configured to mix fuel and air emerging out of the second set 72 of mixing tubes 75 and the central mixing tube 75C. Such an arrangement can provide a more uniform fuel air mixture in the center of the mixing chamber 86 to achieve lower $NO_x$ emission. The peripheral second set 72 of mixing tubes 75 can be tangential to achieve a high velocity on the mixing passage wall to avoid undesirable combustion dynamics. Such tangential mixing tubes can also improve fuel-air mixing in the mixing chamber 86 for lower $NO_x$ emission.

Figure 6:
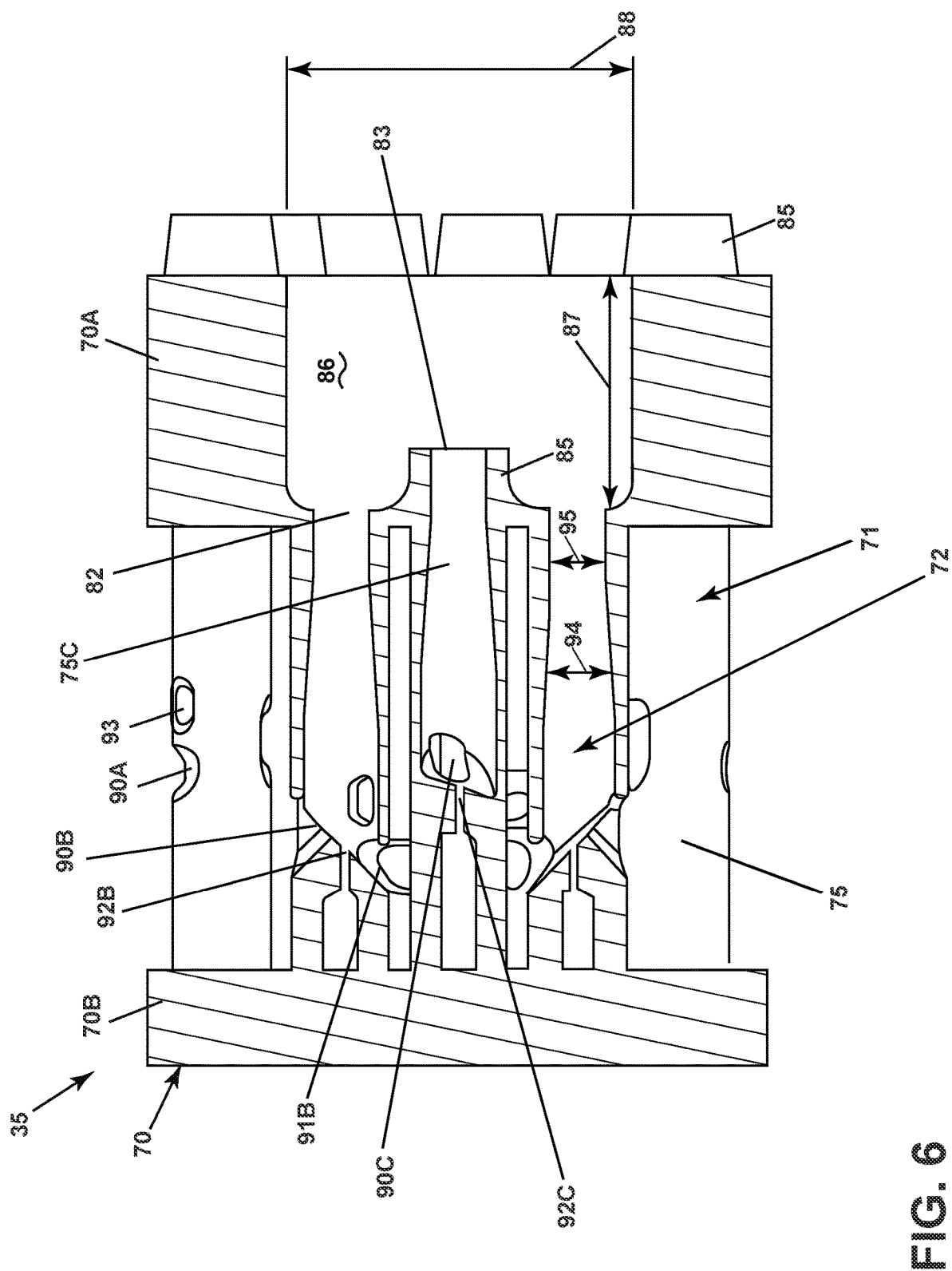
FIG. 6 is a side cross-sectional view of the fuel assembly of FIG. 4 along line VI-VI.

In addition, in the non-limiting example shown, each mixing tube 75 in the first set 71 can include a first outer air inlet 90A, a first inner air inlet 91A, and a first fuel inlet 92A. The central mixing tube 75C can include a central outer air inlet 90C (FIG. 6), a central inner air inlet 91C, and a central fuel inlet 92C. It is also contemplated that each mixing tube 75 in the second set 72 can include a second outer air inlet 90B, a second inner air inlet 91B, and a second fuel inlet 92B, as shown in FIG. 6.

It is further contemplated that a tangential air inlet can be provided in at least some of the mixing tubes of the air-fuel mixer, including the first set 71 of mixing tubes 75, second set 72 of mixing tubes 75, or central mixing tube 75C. In the illustrated example of FIG. 5, tangential air inlets 93 are provided for each mixing tube 75 in the first set 71 though this need not be the case.

During operation, in one exemplary implementation, fuel can be supplied to the first set 71 of mixing tubes 75, second set 72 of mixing tubes 75, or central mixing tube 75C by way of the corresponding first fuel inlets 92A, second fuel inlets 92B, and central fuel inlet 92C. Air can also be supplied to the first set 71 of mixing tubes 75, second set 72 of mixing tubes 75, or central mixing tube 75C by way of the corresponding first outer air inlet 90A, first inner air inlet 91A, second outer air inlet 90B, second inner air inlet 91B, central outer air inlet 90C, or central inner air inlet 91C. In this manner a fuel-air mixture can be formed within the mixing tubes 75, 75C.

The outer air inlets 90A, 90B, 90C can be positioned radially outward from the inner air inlets 91A, 91B, 91C. The fuel inlets 92A, 92B, 92C can be positioned radially between the corresponding outer air inlets 90A, 90B, 90C and inner air inlets 91A, 91B, 91C. In some examples, air can also be supplied to the first set 71 of mixing tubes 75, second set 72 of mixing tubes 75, or central mixing tube 75C by way of the tangential air inlet 93 and configured to further mix or swirl the fuel-air mixture therein. In some examples, the second set 72 of mixing tubes 75 and central mixing tube 75C can form pilot zones or a pilot jet while the first set 71 of mixing tubes 75 can form a main zone or peripheral main jet for the combustor 30 (FIG. 3).

In this manner, fuel and air from the second set 72 of mixing tubes 75 and central mixing tube 75C can combine within the mixing chamber 86 upstream of the first mixture outlets 81. A fuel-air mixture can be provided with optional tangential velocity or swirl to the first mixture outlets 81, second mixture outlets 82, or central mixture outlet 83. Such a tangential velocity can provide for an improved level of fuel-air mixing within each mixing tube 75. In addition, injection of fuel sandwiched between outer and inner air flows can provide for centering the fuel flow along the passage and away from sidewalls of the mixing tube 75.

It is further contemplated that differing fuels, fuel blends, or fuel-air mixtures can be provided to the first set 71 of mixing tubes 75, second set 72 of mixing tubes 75, or central mixing tube 75C. In some examples, the first set 71 of mixing tubes 75, second set 72 of mixing tubes 75, or central mixing tube 75C can include 100% hydrogen fuel, a fuel blend with 50-100% hydrogen, a fuel blend with 0-60% hydrogen, a fuel blend with natural gas fuel, a fuel-air mixture with 0-50% fuel or fuel blend and 0-50% air, or the like, or combinations thereof. One exemplary implementation can include the first set 71 of mixing tubes 75 having a higher-concentration (e.g. "richer") fuel mixture compared to the second set 72 of mixing tubes 75 or central mixing tube 75C. Another exemplary implementation can include the first set 71 of mixing tubes 75 having a lower-concentration (e.g. "leaner") fuel mixture compared to the second set 72 of mixing tubes 75 or central mixing tube 75C.

Another exemplary implementation can include the first set 71 of mixing tubes 75 having a fuel blend of 50-100% hydrogen, the second set 72 of mixing tubes 75 having a fuel blend of 0-60% hydrogen, and central mixing tube 75C having a fuel blend of 0-60% hydrogen. Another exemplary implementation can include the first set 71 of mixing tubes 75, second set 72 of mixing tubes 75, and central mixing tube 75C having 100% hydrogen fuel. Another exemplary implementation can include the first set 71 of mixing tubes 75, second set 72 of mixing tubes 75, and central mixing tube 75C having 100% natural gas fuel. Another exemplary implementation can include the first set 71 of mixing tubes 75 having a hydrocarbon fuel, the second set 72 of mixing tubes 75 having a natural gas fuel, and the central mixing tube 75C having a hydrogen fuel. Still another exemplary implementation can include the first set 71 of mixing tubes 75 having a first fuel-to-air ratio, the second set 71 of mixing tubes 75 having a second fuel-to-air ratio, and the central mixing tube 75C having a third fuel-to-air ratio, wherein the first, second, and third fuel-to-air ratios can be the same or differ from one another.

Additional details of the fuel assembly 35 are shown in FIG. 6, where another cross-sectional view of the fuel assembly 35 is shown along the line VI-VI (FIG. 4). In this view, interior portions of the second set 72 of mixing tubes 75 can be seen in further detail. It is contemplated that any of the mixing tubes 75 in the first set 71, second set 72, or central mixing tube 75C can have an internal cross-sectional width that can be constant or variable. In the example shown, the second set 72 of mixing tubes 75 includes a first cross-sectional width 94 and a second cross-sectional width 95. The second cross-sectional width 95 can be smaller than the first cross-sectional width 94 in some examples. In such a case, the second set 72 can have a converging cross-sectional width in a direction toward the second mixture outlet 82. In some examples, the second cross-sectional width 95 can be larger than the first cross-sectional width 94 to form a diverging cross-sectional area. In some examples, the second cross-sectional width 95 can be the same as the first cross-sectional width 94.

In addition, any of the first mixture outlets 81 (FIG. 5), second mixture outlets 82, or central mixture outlet 83 can be configured to direct outlet flows at least partially in a direction unaligned with the longitudinal axis 52. For example, the second mixture outlets 82 can be oriented or angled to provide a tangential or swirling flow within the mixing chamber 86. Such an arrangement can provide for additional mixing of exhausted outlet flows. Combinations of swirling and non-swirling outlets can also be utilized in the first or second mixture outlets 81, 82 or the central mixture outlet 83. Some non-limiting exemplary implementations include: non-swirling outlets for each of the first and second mixture outlets 81, 82 and central mixture outlet 83; swirling outlets for each of the first and second mixture outlets 81, 82 and central mixture outlet 83; non-swirling second mixture outlets 82, non-swirling central mixture outlet 83, and swirling first mixture outlets 81; swirling second outlets 82, swirling central mixture outlet 83, and non-swirling first mixture outlets 81; the first mixture outlets 81 having non-swirling outlets, the second mixture outlets 82 having a first swirl direction, and the central mixture outlet 83 having a second swirl direction different from the first swirl direction; or the like, or combinations thereof.

Figure 7:
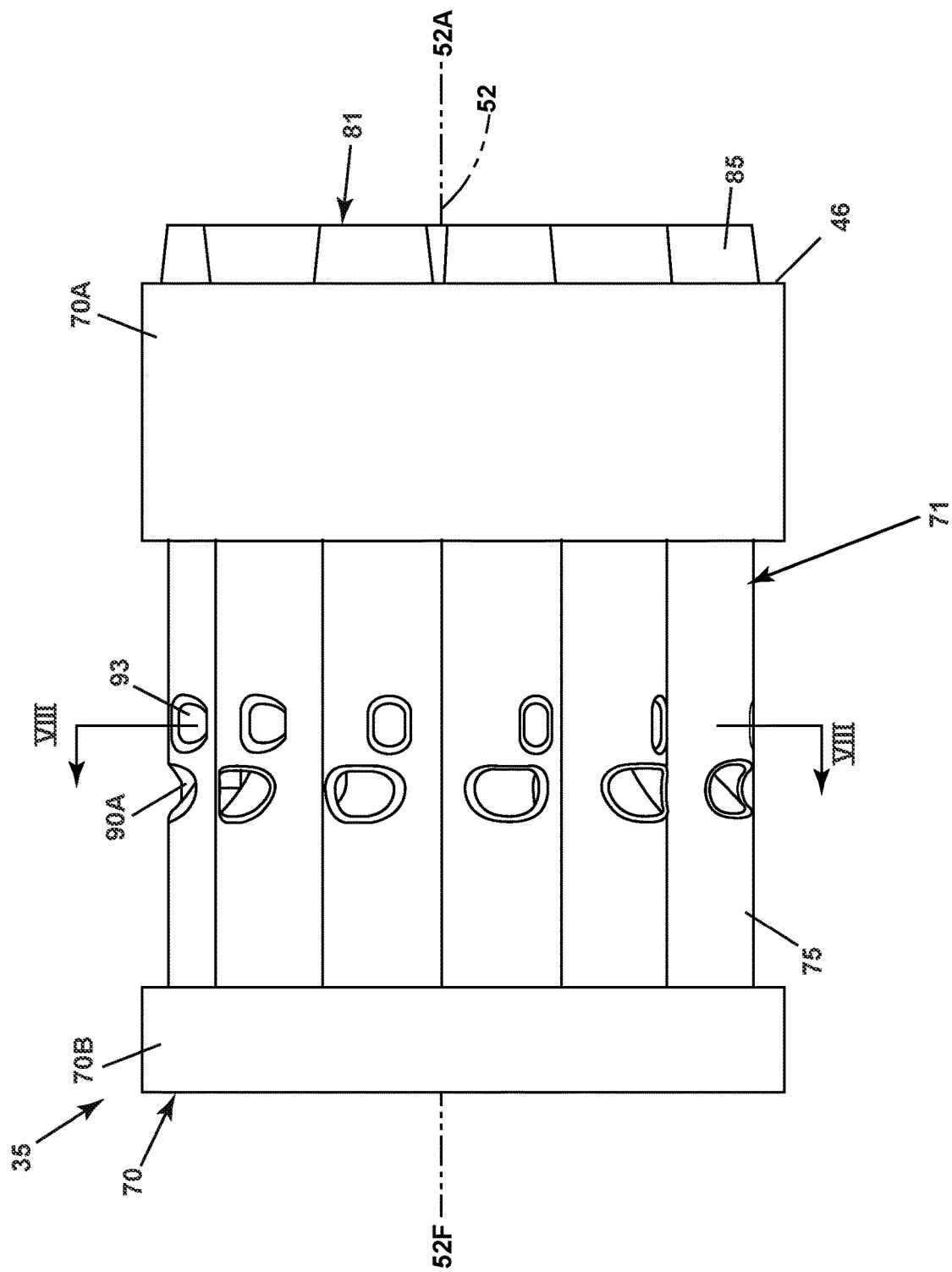
FIG. 7 is a side view of the fuel assembly of FIG. 4.

FIG. 7 illustrates a side view of the fuel assembly 35. The first set 71 of mixing tubes 75 is shown with outer air inlets 90A and tangential air inlets 93. The outer air inlets 90A can provide air into the first set 71 that is at least partially aligned with the longitudinal axis 52. The tangential air inlets 93 can provide air into the first set 71 of mixing tubes 75 in a direction generally perpendicular to the longitudinal axis 52.

Figure 8:
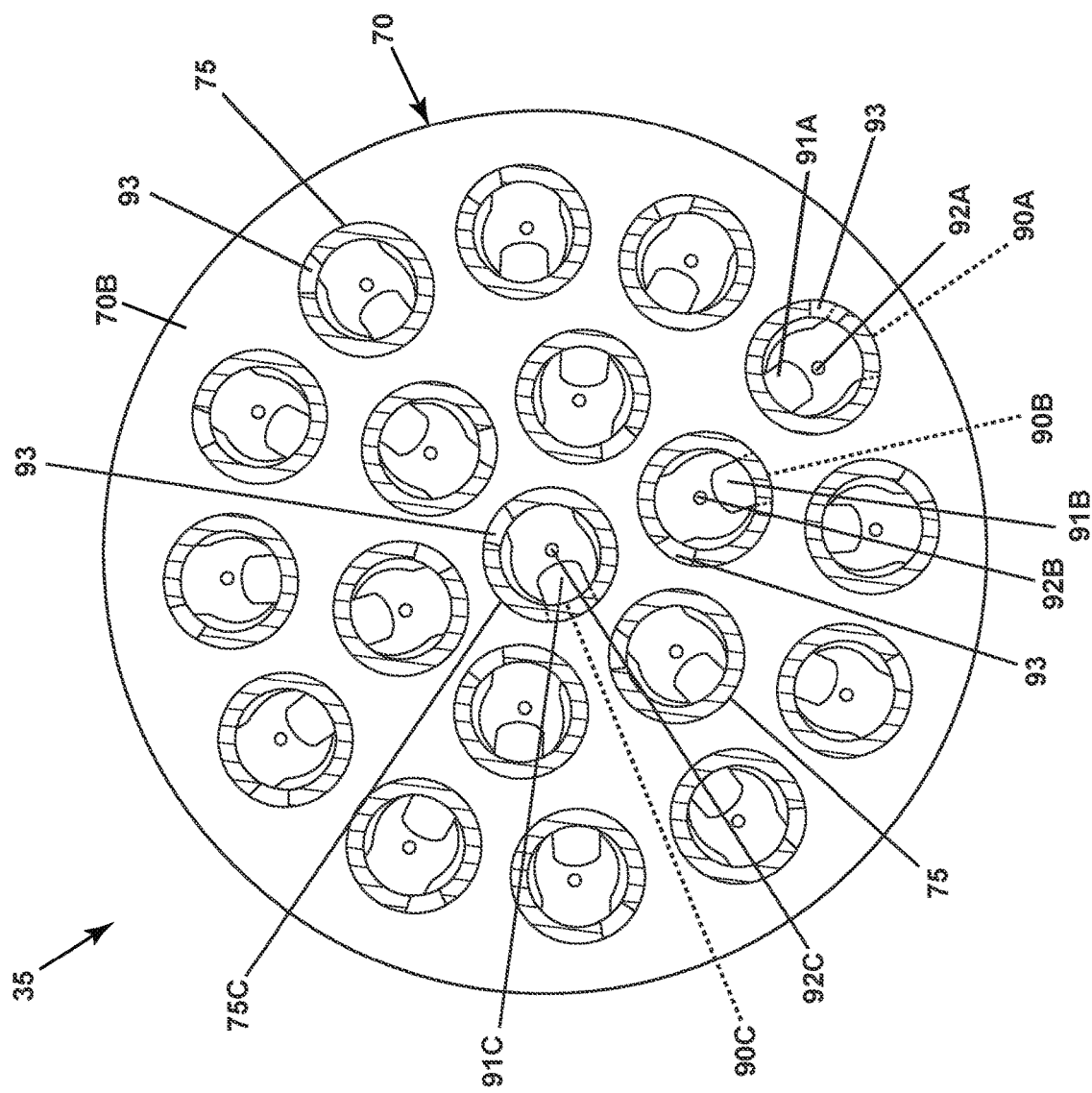
FIG. 8 is a front cross-sectional view of the fuel assembly of FIG. 7 along line VIII-VIII.

FIG. 8 illustrates a front cross-sectional view of the fuel assembly 35 along the line VIII-VIII (FIG. 7) through the tangential air inlets 93. In this view, the fuel inlets 92A, 92B, 92C are visible adjacent the inner air inlets 91A, 91B, 91C, with the second collar 70B visible as shown. Each mixing tube 75 and the central mixing tube 75C can have respective fuel inlets 92A, 92B, 92C positioned between two opposing air jets by way of the inner air inlets 91A, 91B, 91C and outer air inlets 90A, 90B, 90C (FIG. 6). In this manner, fuel and air can be streamlined together within each mixing tube 75, and also tangentially mixed or swirled by way of the tangential air inlets 93. In some examples, inlets for adjacent mixing tubes 75 can be angularly staggered so as to not face each other directly. Such an arrangement can avoid possible flow starvation. In some examples, inlets for adjacent mixing tubes 75 can be arranged opposite one another, such as in fuel assemblies with larger spacings between adjacent mixing tubes 75.

Figure 9:
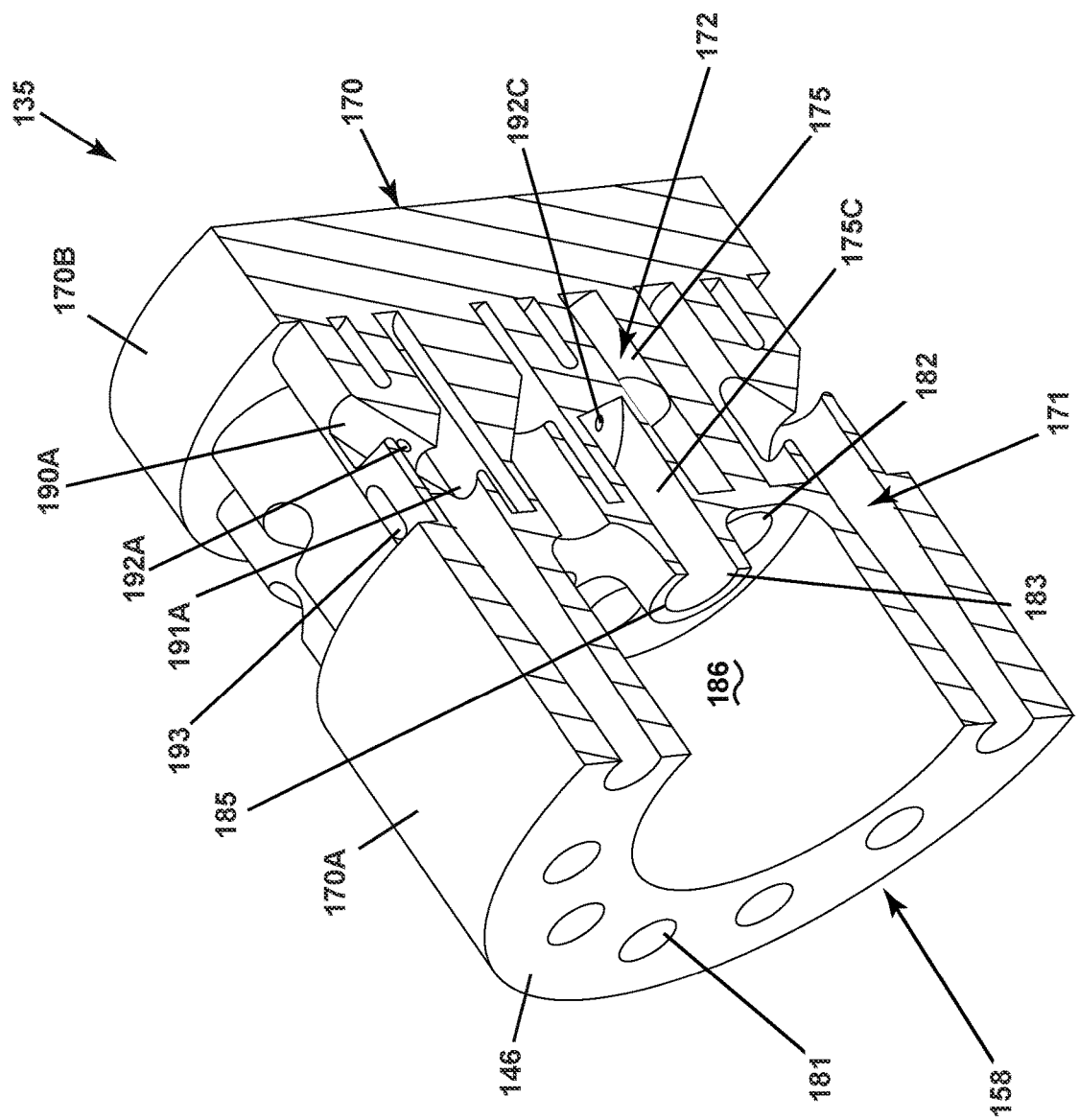
FIG. 9 is a cross-sectional view of another fuel assembly that can be utilized in the combustor of FIG. 2 in accordance with various aspects described herein.

Turning to FIG. 9, another fuel assembly 135 is illustrated that can be utilized in the combustor 30 (FIG. 3). The fuel assembly 135 is similar to the fuel assembly 35 of FIGS. 4-8; therefore, like parts will be identified with like numerals increased by 100, with it being understood that the description of the like parts of the fuel assembly 35 applies to the fuel assembly 135, except where noted.

The fuel assembly 135 can include a body 170 having a first collar 170A and a second collar 170B. The body 170 can also include a dome wall 146 and a fuel outlet 158. The body 170 can also include multiple mixing tubes 175. In the example shown, a first set 171 of mixing tubes 175, a second set 172 of mixing tubes 175, and a central mixing tube 175C are illustrated in the body 170 of the fuel assembly 135. Mixing tubes 175 in the first set 171 are illustrated having first outer air inlets 190A, first inner air inlets 191A, first fuel inlets 192A, and first mixture outlets 181. Mixing tubes 175 in the second set 172 are illustrated with second mixture outlets 182. It will be understood that the mixing tubes 175 in the second set 172 can also include a second outer air inlet similar to second outer air inlet 90B, a second inner air inlet similar to second inner air inlet 91B, and a second fuel inlet similar to second fuel inlet 92B (FIG. 8). The central mixing tube 175C is illustrated with central fuel inlet 192C and central mixture outlet 183. It will be understood that the central mixing tube 175C can also include a central outer air inlet similar to central outer air inlet 90C, and a central inner air inlet similar to central inner air inlet 91C (FIG. 8). In addition, tangential air inlets 193 can be provided in any or all of the first set 171 of mixing tubes 175, second set 172 of mixing tubes 175, or central mixing tube 175C. A mixing chamber 186 can also be provided in the body 170 as shown.

One difference is that the first mixture outlets 181 can be formed directly on the dome wall 146. In such a case, the combustion flame can be seated directly on the dome wall 146 during operation. In addition, a projecting tip 185 is illustrated at the central mixture outlet 183 though this need not be the case. In some examples, the fuel assembly 135 can be formed without any tips at any mixture outlets, with combustion flames being seated directly on the corresponding face of the body 170 at each mixture outlet 181, 182, 183.

The above described aspects provide for multiple benefits. The use of multiple mixing tubes, which are axially and radially staggered, can provide for a compact and shorter flame compared to traditional combustors. The axially-shorter central mixing tubes and mixing chamber within the body of the fuel assembly can provide for an axially-shortened combustor, as well as improved mixing time and flow development prior to interacting with the peripheral outer/main mixing tube flow. The different lengths of each mixing tube or set of mixing tubes can provide for varying a fuel mixing profile at mixer exit to reduce combustion dynamics. Such an arrangement can provide for a reduction in undesirable combustion byproducts, including NOR.

In examples where differing mixing lengths are utilized within a set of mixing tubes, differences in fuel-air distribution can be provided downstream of the set of mixing tubes. Mixing lengths between a first set of mixing tubes and a second set of mixing tubes can be arranged such that fuel-air mixture from first set of mixing tubes and fuel air mixture from second set of mixing tubes when they mix downstream can create a radially-varying distribution of fuel-air mixture.

In examples where a fuel-air mixture varies circumferentially (e.g. a lean fuel-air mixture at a first location and a rich fuel-air mixture at a second location), such circumferential distribution of fuel concentration can provide an out-of-phase or an in-phase alternating fuel-air mixing profile at the mixer exit, which can reduce undesirable combustion dynamics. Additional radial distribution of fuel concentrations can further reduce such combustion dynamics. Varying fuel tube sizes or diameters can also form a varied fuel-air concentration distribution that can provide similar benefits to varying a fuel-air mixture concentration, with reduction in undesirable combustion dynamics.

The use of peripheral main jets can provide for control of the spread of the tangential or swirling flow from the central mixing chamber, which can control or reduce the combustor liner temperature. Interaction between tangential or swirling central tubes and peripheral main tubes can create flow shear, providing for improved mixing post exit.

In addition, the use of a protruding surface can provide for shifting or moving the combustion flame away from surfaces of the fuel assembly, including the dome. Such an arrangement can provide for additional control of component temperatures, including the dome plate or combustor liner.

While described with respect to a turbine engine, it should be appreciated that aspects of the disclosure can have general applicability to any combustor. Aspects of the disclosure described herein can also be applicable to engines with propeller sections, fan and booster sections, turbojet engines, or turboshaft engines, in non-limiting examples.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

Further aspects of the disclosure are provided by the following clauses:

A turbine engine, comprising a compressor section, a combustion section, and a turbine section in serial flow arrangement, and the combustion section having a combustor comprising a combustor liner at least partially defining a combustion chamber, and a fuel-air mixer comprising a first set of mixing tubes and a second set of mixing tubes, radially inward of the first set of mixing tubes, wherein each mixing tube in the first set of mixing tubes and in the second set of mixing tubes comprises a fuel inlet, an air inlet, and a mixture outlet confronting the combustion chamber.

The turbine engine of any preceding clause, further comprising a central mixing tube positioned radially inward of the second set of mixing tubes and having a central fuel inlet, a central air inlet, and a central mixture outlet confronting the combustion chamber.

The turbine engine of any preceding clause, wherein the central mixture outlet is located forward of the mixture outlets of the first set of mixing tubes.

The turbine engine of any preceding clause, further comprising a mixing chamber within the body and positioned radially inward of the first set of mixing tubes.

The turbine engine of any preceding clause, wherein the central mixture outlet is fluidly coupled to the mixing chamber.

The turbine engine of any preceding clause, further comprising at least one circumferentially-extending collar at least partially forming at least one of the first set of mixing tubes or the mixing chamber.

The turbine engine of any preceding clause, wherein the at least one circumferentially-extending collar at least partially defines a dome wall in the combustor.

The turbine engine of any preceding clause, further comprising a projecting tip located at each mixture outlet in the first set of mixing tubes and projecting from the dome wall.

The turbine engine of any preceding clause, further comprising a second air inlet located on a sidewall of each mixing tube in the first set of mixing tubes, with the second air inlet spaced from the air inlet along the longitudinal axis.

The turbine engine of any preceding clause, further comprising a projecting tip located at the central mixture outlet, wherein each mixture outlet in the second set of mixing tubes is located forward of the central mixture outlet along a longitudinal axis extending through the fuel-air mixer.

The turbine engine of any preceding clause, wherein each mixture outlet in the first set of mixing tubes is located aft of the central mixture outlet with respect to the longitudinal axis.

The turbine engine of any preceding clause, wherein a mixing tube in the second set of mixing tubes comprises a decreasing cross-sectional width in a direction toward the mixture outlet.

The turbine engine of any preceding clause, wherein the mixing chamber comprises one of an increasing width, a decreasing width, or a constant width in a direction along a longitudinal axis extending through the fuel-air mixer.

The turbine engine of any preceding clause, further comprising a first fuel blend with 50-100% hydrogen in the first set of mixing tubes and a second fuel blend with 0-60% hydrogen in the central mixing tube.

A combustor for a turbine engine, comprising a combustor liner at least partially defining a combustion chamber, and a fuel-air mixer comprising a first set of mixing tubes and a second set of mixing tubes, radially inward of the first set of mixing tubes, wherein each mixing tube in the first set of mixing tubes and in the second set of mixing tubes comprises a fuel inlet, an air inlet, and a mixture outlet confronting the combustion chamber.

The combustor of any preceding clause, further comprising a central mixing tube positioned radially inward of the second set of mixing tubes and having a central fuel inlet, a central air inlet, and a central mixture outlet confronting the combustion chamber.

The combustor of any preceding clause, further comprising a mixing chamber within the body and positioned radially inward of the first set of mixing tubes.

The combustor of any preceding clause, wherein the central mixture outlet is fluidly coupled to the mixing chamber.

The combustor of any preceding clause, further comprising a circumferentially-extending collar at least partially forming the mixing chamber and at least partially defining a dome wall in the combustor.

The combustor of any preceding clause, further comprising a projecting tip located at the mixture outlet and projecting from the dome wall.

The combustor of any preceding clause, further comprising a central projecting tip located at the central mixture outlet, wherein each mixture outlet in the second set of mixing tubes is located forward of the central mixture outlet along a longitudinal axis extending through the fuel-air mixer, and wherein each mixture outlet in the first set of mixing tubes is located aft of the central mixture outlet with respect to the longitudinal axis.

The combustor of any preceding clause, further comprising a mixing chamber within the fuel-air mixer and positioned radially inward of the first set of mixing tubes and aft of the mixture outlets of the second set of mixing tubes with respect to the longitudinal axis.

The combustor of any preceding clause, wherein the central mixing tube includes a projecting tip extending into the mixing chamber and forming the central mixture outlet.

What is claimed is:

1. A turbine engine, comprising:
  a compressor section, a combustion section, and a turbine section in serial flow arrangement, with the combustion section having a combustor comprising:
    a dome assembly and a circumferentially-extending combustor liner collectively bounding a combustion chamber at a forward end; and
    a fuel-air mixer with a body extending forward to aft along a longitudinal axis and comprising:
      a first set of mixing tubes and a second set of mixing tubes each arranged circumferentially about the body, with the second set of mixing tubes spaced radially inward from the first set of mixing tubes, wherein each mixing tube in the first set of mixing tubes and the second set of mixing tubes comprises a fuel inlet, an air inlet, and a mixture outlet;
      a circumferentially-extending collar bounding at least the first set of mixing tubes and comprising an aft surface defining at least a portion of a dome wall in the dome assembly, wherein the mixture outlet of each of the second set of mixing tubes is positioned forward of the dome wall;
      a mixing chamber within the fuel-air mixer and positioned radially inward of the mixture outlet of each of the first set of mixing tubes, wherein the mixture outlet of each of the second set of mixing tubes discharges into the mixing chamber; and
      a central mixing tube positioned radially inward of the mixture outlet of each of the second set of mixing tubes and having a central fuel inlet, a central air inlet, and a central mixture outlet confronting the combustion chamber, wherein the central mixture outlet is located within the mixing chamber such that the central mixture outlet is forward of the mixture outlet of each of the first set of mixing tubes and aft of the mixture outlet of each of the second set of mixing tubes.

2. The turbine engine of claim 1, wherein the mixing chamber comprises a width that is one of increasing, decreasing, or constant along the longitudinal axis.

3. The turbine engine of claim 1, wherein the circumferentially-extending collar at least partially forms at least one of the first set of mixing tubes or the mixing chamber.

4. The turbine engine of claim 1, further comprising a projecting tip located at the mixture outlet of each of the first set of mixing tubes and projecting from the dome wall.

5. The turbine engine of claim 1, further comprising a second air inlet located on a sidewall of each mixing tube in the first set of mixing tubes, with the second air inlet spaced from the air inlet along the longitudinal axis.

6. The turbine engine of claim 5, further comprising a projecting tip located at the central mixture outlet, wherein the mixture outlet of each of the second set of mixing tubes is located forward of the central mixture outlet along the longitudinal axis.

7. The turbine engine of claim 2, wherein the mixture outlet of each of the first set of mixing tubes is located aft of the central mixture outlet with respect to the longitudinal axis.

8. The turbine engine of claim 1, further comprising a first fuel blend with 50-100% hydrogen in the first set of mixing tubes and a second fuel blend with 0-60% hydrogen in the central mixing tube.

9. The combustor of claim 1, further comprising a central mixing tube positioned radially inward of the second set of mixing tubes and having a central fuel inlet, a central air inlet, and a central mixture outlet confronting the combustion chamber.

10. The combustor of claim 9, further comprising a central projecting tip located at the central mixture outlet, wherein the mixture outlet of each of the second set of mixing tubes is located forward of the central mixture outlet with respect to the longitudinal axis, and wherein the mixture outlet of each of the first set of mixing tubes is located aft of the central mixture outlet with respect to the longitudinal axis.

11. A combustor for a turbine engine, comprising:
  a dome assembly and a circumferentially-extending combustor liner collectively bounding a combustion chamber at a forward end; and
  a fuel-air mixer with a body extending forward to aft along a longitudinal axis and comprising:
    a first set of mixing tubes and a second set of mixing tubes each arranged circumferentially about the body, with the second set of mixing tubes spaced radially inward from the first set of mixing tubes, wherein each mixing tube in the first set of mixing tubes and the second set of mixing tubes comprises a fuel inlet, an air inlet, and a mixture outlet;
    a circumferentially-extending collar bounding at least the first set of mixing tubes and comprising an aft surface defining at least a portion of a dome wall in the dome assembly, wherein the mixture outlet of each of the second set of mixing tubes is positioned forward of the dome wall;
    a mixing chamber within the fuel-air mixer and positioned radially inward of the mixture outlet of each of the first set of mixing tubes, wherein the mixture outlet of each of the second set of mixing tubes discharges into the mixing chamber; and
    a central mixing tube positioned radially inward of the mixture outlet of each of the second set of mixing tubes and having a central fuel inlet, a central air inlet, and a central mixture outlet confronting the combustion chamber, wherein the central mixture outlet is located within the mixing chamber such that the central mixture outlet is forward of the mixture outlet of each of the first set of mixing tubes and aft of the mixture outlet of each of the second set of mixing tubes.

12. The combustor of claim 11, further comprising a wherein the circumferentially-extending collar at least partially forming forms the mixing chamber and at least partially defining a dome wall in the combustor.

13. The combustor of claim 12, further comprising a projecting tip located at the mixture outlet of a mixing tube in one of the first set of mixing tubes or the second set of mixing tubes and projecting from the dome wall.

* * * * *